(12) United States Patent
Anderson et al.

(10) Patent No.: US 8,590,864 B2
(45) Date of Patent: Nov. 26, 2013

(54) SEMI-TUBULAR VANE AIR SWIRLER

(75) Inventors: Matthew S. Anderson, Allendale, MI (US); John P. McClure, Holland, MI (US); Clark Fraser Paterson, Loveland, CO (US)

(73) Assignees: Woodward FST, Inc., Rockford, IL (US); Woodward, Inc., Fort Collins, CO (US)

( * ) Notice: Subject to any disclaimer, the term of this patent is extended or adjusted under 35 U.S.C. 154(b) by 484 days.

(21) Appl. No.: 12/909,384

(22) Filed: Oct. 21, 2010

(65) Prior Publication Data

US 2012/0096867 A1   Apr. 26, 2012

(51) Int. Cl.
*F02M 29/06*   (2006.01)

(52) U.S. Cl.
USPC ..... 261/79.1; 60/748; 236/79.2; 236/DIG. 55

(58) Field of Classification Search
USPC ........ 261/78.1, 78.2, 79.1, 79.2, 116; 60/748; 48/189.3–189.5
See application file for complete search history.

(56) References Cited

U.S. PATENT DOCUMENTS

| 2,014,907 | A | * | 9/1935 | Myers ......................... 261/79.1 |
| 2,102,361 | A | * | 12/1937 | Gladwell ....................... 261/116 |
| 3,393,984 | A | * | 7/1968 | Wisman ....................... 48/189.4 |
| 3,512,359 | A | * | 5/1970 | Pierce ............................. 60/748 |
| 3,544,290 | A | * | 12/1970 | Larson, Sr. et al. .......... 48/189.5 |
| 4,301,657 | A |   | 11/1981 | Penny |
| 4,887,432 | A |   | 12/1989 | Mumford et al. |
| 5,197,290 | A |   | 3/1993 | Lee et al. |
| 5,488,829 | A |   | 2/1996 | Southall et al. |
| 7,093,826 | B2 | * | 8/2006 | DeLisle ........................ 261/78.1 |
| 7,111,829 | B2 | * | 9/2006 | DeLisle ........................ 261/78.1 |
| 7,513,489 | B2 | * | 4/2009 | DeLisle ........................ 261/78.1 |
| 2005/0230854 | A1 | * | 10/2005 | DeLisle ........................ 261/79.1 |
| 2007/0227149 | A1 |   | 10/2007 | Biebel et al. |

* cited by examiner

*Primary Examiner* — Richard L Chiesa
(74) *Attorney, Agent, or Firm* — Reinhart Boerner Van Deuren P.C.

(57) ABSTRACT

A semi-tubular vane air swirler is provided. In one embodiment the air swirler is a deep drawn sheet metal component having a first and a second set of semi-tubular vanes formed therein. In one embodiment the semi-tubular air vanes include a first and a second portion formed by upsetting the sheet metal in opposing directions to create mirrored vane geometry, thereby doubling the open area of the vane.

20 Claims, 3 Drawing Sheets

SEMI-TUBULAR VANE AIR SWIRLER

FIELD OF THE INVENTION

This invention generally relates to air swirlers for fuel injection and combustion systems, and more particularly to air swirlers constructed from sheet metal.

BACKGROUND OF THE INVENTION

In order to improve combustion efficiency and reduce the generation of NOx and other objectionable emissions, modern fuel injector nozzle designs typically use an air swirler, such as that illustrated in FIG. 4. As illustrated in this FIG. 4, the typical air swirler 400 includes a plurality of slotted vanes 402 cut into the body of the air swirler 400. These slotted vanes 402 are typically angled to direct the air flowing through the apertures 404 into a swirling pattern that aids in the atomization and mixing of the fuel injected through the fuel nozzle into the combustion area of the combustion chamber. In doing so, much more complete combustion of the injected fuel is accomplished, thereby achieving the increased efficiency and reduced emissions discussed above.

Unfortunately, space limitations and material costs typically apply pressure for the reduction in nozzle size. However, flow requirements to achieve higher output power and higher efficiencies tend to prohibit such size reductions, contrary to the space and cost pressures that would tend to drive a reduction in size. Indeed, in most combustion fuel nozzle designs, the overall diameter of the assembly is dictated by the size of the air swirler itself.

Since air flow is controlled by vane size, an increase in mass flow rate required by higher fuel flow requirements typically necessitates an increased vane size. However, to ensure low costs, typical air swirlers are designed to be manufactured as a deep drawn sheet metal component. As such, swirler vane size is dictated by how much the sheet metal can be upset without resulting in tearing thereof. Because of this limitation, the continued pressure for an increase in vane size to accommodate the higher flow requirements would require the swirler diameter to grow accordingly. Such increased diameter, however, is directly contrary to the requirement for reduced nozzle size to accommodate the space limitations and material cost pressures in many applications.

Further, with increased air flow requirements, additional problems associated with the typical slotted vanes 402 of the air swirler 400 become apparent. While such slotted vanes 402 direct air flowing through the apertures 404 in a swirling pattern based on the angle of the slotted vane 402, as the air flow increases therethrough, more and more of the air can leak out around the sides of the slotted vanes 402. This leaked air flow disrupts the swirling pattern, and therefore reduces the efficiency of the air/fuel mixing for which the air swirler was designed.

Additionally, as the air flow increases the slotted vanes 402 are susceptible to deformation and potentially fatigue. Such deformation also reduces the designed swirling pattern produced thereby as the angle of the slotted vanes 402 may be increased under the enhanced pressure of the greater air flow. Such a change in the vane angle will also disrupt the swirl pattern, lessening the swirl strength and therefore reducing the efficiency of the air fuel mixing.

The fatigue experienced by the slotted vanes 402 along their bend point over the wider flow range may ultimately lead to failure of the slotted vanes 402. As will be apparent, loss of a slotted vane 402 will greatly disrupt the swirl pattern, resulting in a much weakened swirl strength, and therefore a large reduction in air fuel mixing efficiency. While such problems could be addressed by utilizing stronger materials or providing structures to reinforce the slotted vanes 402, such would drive up material costs prohibitively.

There is a need, therefore, for a fuel nozzle air swirler that provides enhanced flow without increasing overall diameter of the air swirler or increasing material costs. Embodiments of the air swirler of the present invention provide such air swirlers. These and other advantages of the invention, as well as additional inventive features, will be apparent from the description of the invention provided herein.

BRIEF SUMMARY OF THE INVENTION

In view of the above, embodiments of the present invention provide a new and improved air swirler that overcomes one or more of the problems existing in the art. More particularly, embodiments of the present invention provide a new and improved air swirler for a fuel injector nozzle manufactured as a deep drawn sheet metal component. Still more particularly, embodiments of the present invention provide a new and improved sheet metal air swirler that allows increased and/or more efficient air flow without increasing the overall diameter of the air swirler.

In one embodiment, a deep drawn sheet metal air swirler includes a plurality of semi-tubular vanes formed therein. Each of the plurality of semi-tubular vanes are formed on end walls of the air swirler and are directed to produce a swirling air pattern as air flows therethrough. Because the semi-tubular vanes include a continuous wall along the sides thereof, air leakage around the vanes, as is known to occur in the slotted vanes of typical air swirlers, cannot occur.

In one embodiment the air swirler includes a central well having a first end wall through which a fuel injector injects fuel. A first plurality of semi-tubular vanes are formed within the central well and provide a first air swirl pattern therein. In one embodiment, a second end wall surrounding the central well includes a second plurality of semi-tubular vanes formed therein. This second plurality of semi-tubular vanes forms a second swirling air pattern. In one embodiment, both the first and second swirling air flow patterns rotate in the same direction.

In a further embodiment, each of the semi-tubular vanes are formed as bilateral semi-tubular vanes having a first portion in a mirrored second portion extending in opposite directions relative to the end face in which they are formed. The bilateral semi-tubular vanes effectively double the open area of the vane as compared to embodiments utilizing a unilateral semi-tubular vane.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
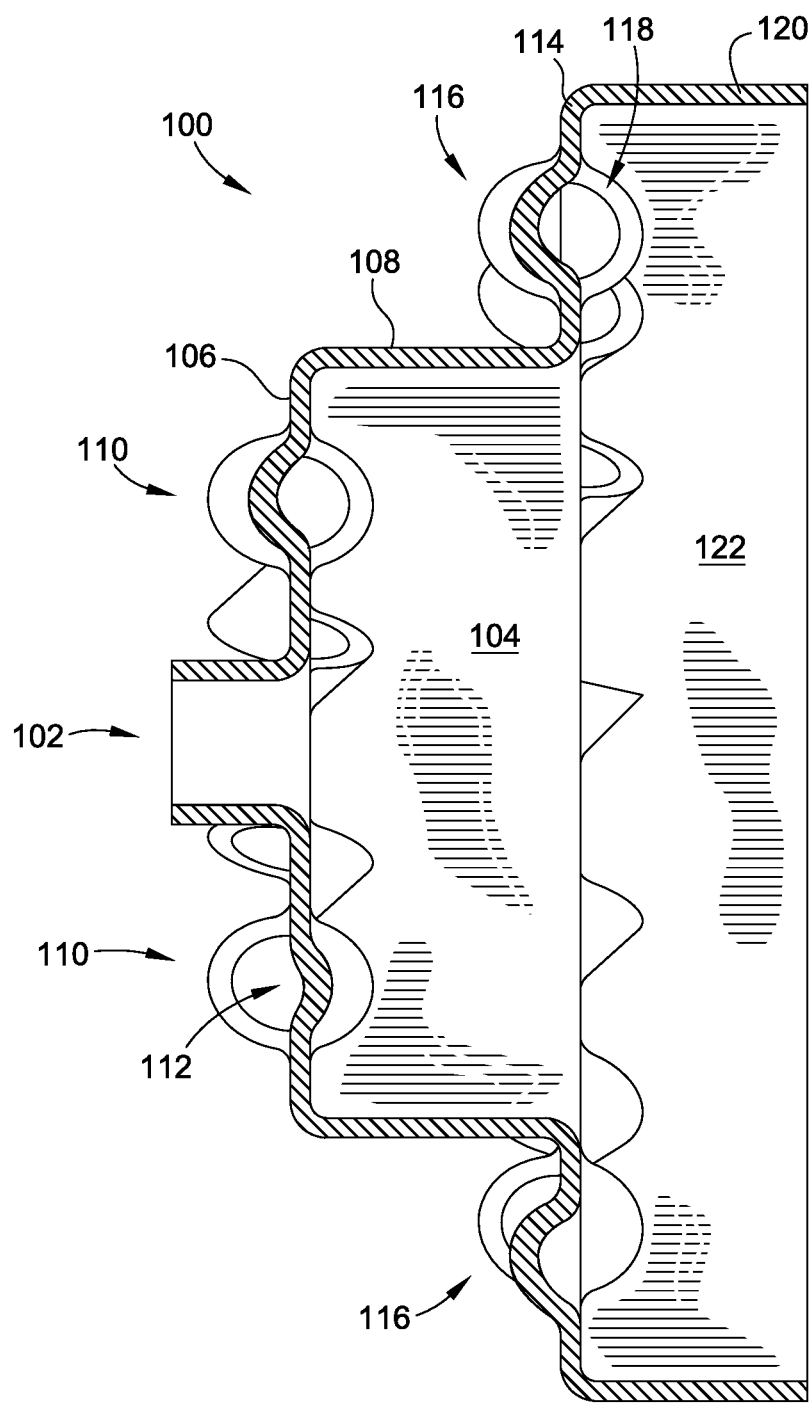
FIG. 1 is a cross-sectional side view illustration of an embodiment of a semi-tubular vane air swirler having bilateral vanes constructed in accordance with the principles of the present invention.

Turning again to the drawings, there is illustrated in FIG. 1 an embodiment of an air swirler 100 constructed in accordance with the teachings of the present invention. Such an air swirler 100, may be used in various operating environments to aid in the mixing of the air and fuel for combusting in a combustion chamber. In one exemplary embodiment, the air swirler 100 is a deep drawn sheet metal component for use with a fuel injector for a diesel particulate filter regeneration burner. Those skilled in the art, however, will recognize that other combustor environments will benefit from the enhanced air flow capability through an air swirler of a given diameter enabled by embodiments of the present invention, and therefore the following discussion as it relates to the exemplary operating environment should be taken by way of example and not by way of limitation.

As shown in FIG. 1, the air swirler 100 is formed to include a central fuel nozzle receiving aperture 102 through which fuel to be combusted is injected. Such fuel is first admitted into a central well 104 having an end wall 106 and a side wall 108. The end wall 106 has formed therein a first plurality of semi-tubular vanes 110. Each of the semi-tubular vanes 110 form an air flow aperture 112 through the end wall 106 for admitting air into the central well 104. The semi-tubular vanes 110 are angled so that the air admitted through the apertures 112 flows in a swirling pattern within the central well 104 to aid in the mixing of the air and fuel injected through the fuel nozzle receiving aperture 102.

In one embodiment, the air swirler 100 also includes a flange portion 114 extending radially outward from the central well 104. The flange portion 114 has a second plurality of semi-tubular vanes 116 formed therein. Each of these semi-tubular vanes 116 form an air flow aperture 118 therethrough, also to admit air into the combustion chamber. The semi-tubular vanes 116 are angled so that the air admitted through the apertures 118 flows in a swirling pattern further to aid in the mixing of the air and fuel injected through the fuel nozzle receiving aperture 102. In the embodiment illustrated in FIG. 1, the flange portion 114 includes a flange side wall 120 that extends axially away from the end wall 106 to form a swirl chamber 122.

As may be seen in this FIG. 1, the direction of the angle of the vanes 110 and 116 are such to aid in the swirling pattern, i.e., they are angled such that both swirling patterns are clockwise or both counter-clockwise. While the direction of induced rotation of the swirl patterns may be the same, the actual angle of the vanes 110, 116 may be the same or different depending on the desired overall swirl pattern. A shallower angle would produce a flatter, faster swirl pattern, while a greater angle would produce a longer, slower swirl pattern. Indeed, the angle of particular vanes or groups of vanes may differ from those of others to form more complex swirling patterns. In an alternate embodiment, the direction of the angle of the vanes 110, 116 may be different so as to provide a shearing relationship between the swirling air flows formed thereby.

Figure 2:
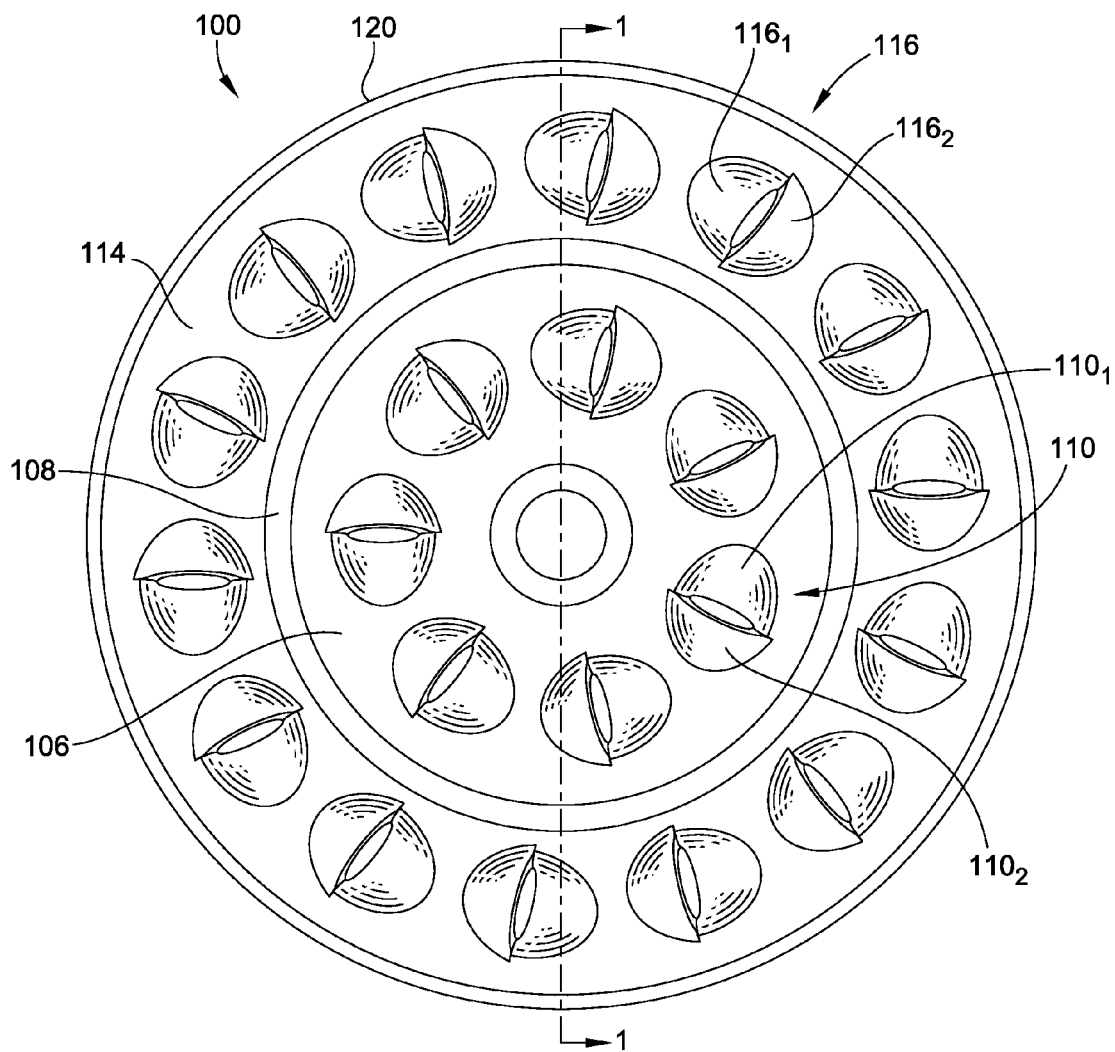
FIG. 2 is a front view illustration of the semi-tubular vane air swirler of FIG. 1.

As may be seen more clearly from the end view of FIG. 2, each of the first plurality of semi-tubular vanes 110 and the second plurality of semi-tubular vanes 116 include a first portion $110_1$, $116_1$, and a second portion $110_2$, $116_2$. These first and second portions ($110_1$, $110_2$, and $116_1$, $116_2$) create a mirrored vane geometry in one embodiment that doubles the open area of each of the semi-tubular vanes 110, 116 compared to, e.g. the embodiment of FIG. 3 discussed more fully below. In another embodiment, the vane geometry is not mirrored, but instead first and second portions ($110_1$, $110_2$, and $116_1$, $116_2$) are punched or drawn to two different axial angles. This results in a simplified airfoil (camber) shape to the swirler 100. In a further embodiment, the vanes 110, 116 are formed with a curvature for a continuous camber to the airfoil shape.

This mirrored vane geometry is formed in one embodiment by upsetting the sheet metal in opposing directions relative to the plane of the wall (106, 114) through which the semi-tubular vanes (110, 116) are formed. In this way, the effective vane size can be increased for a given diameter air swirler without threat of tearing the sheet metal from which the air swirler 100 is formed. This is particularly advantageous when the air swirler 100 is a deep drawn sheet metal structure.

By using such a bilateral vane design, the air swirler 100 provides increased air flow capacity over the prior slotted vane designs without increasing the diameter of the air swirler. By keeping the diameter small compared to the air flow capacity, material costs are reduced and packaging space limitations are alleviated. A further advantage is the reduction in component weight associated with overall reduced nozzle size. Further, such semi-tubular vanes 110, 116 prohibit air from leaking out around the sides of the vanes as is experienced with the conventional slotted vane designs (see e.g., FIG. 4). As such, the semi-tubular vanes 110, 116 provides more efficient air utilization and greater swirl strength, particularly during high flow conditions. Additionally, the vane geometry is much more rigid than the vane geometry of the typical slotted vane air swirler shown in FIG. 4, and is therefore less susceptible to deformation and potentially fatigue.

Figure 3:
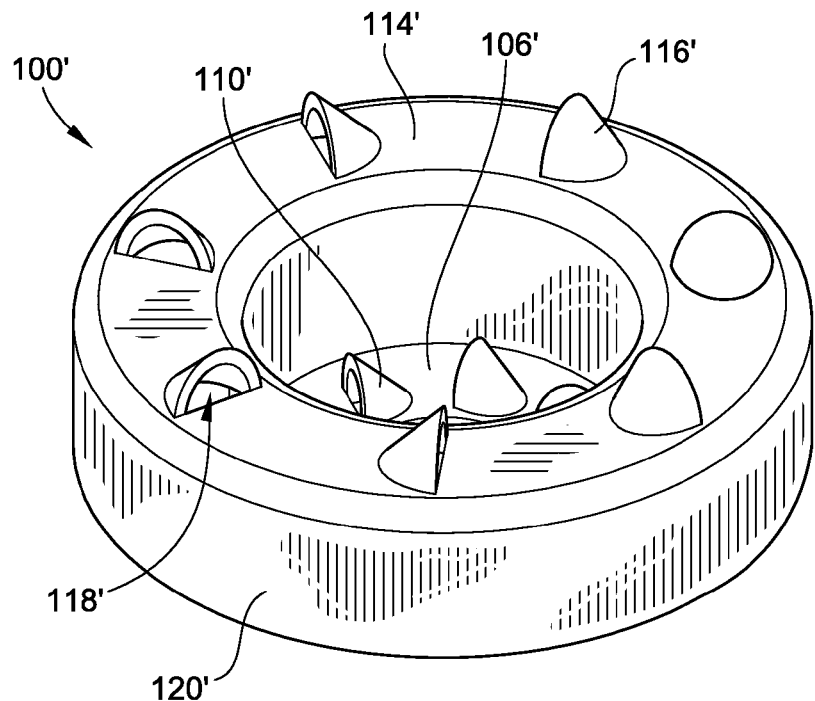
FIG. 3 is an isometric view of an alternate embodiment of a semi-tubular vane air swirler having unilateral vanes constructed in accordance with the principles of the present invention.

FIG. 3 illustrates an alternate embodiment of the air swirler 100' that utilizes unilateral semi-tubular vanes 110', 116' as opposed to the bilateral semi-tubular vanes 110, 116 illustrated in the embodiment of FIGS. 1-2. While FIG. 3 illustrates the configuration of these vanes 110' and 116' having their semi-tubular portion extending into or towards the combustion chamber, a mirrored configuration may also be used to produce the swirling air flow (similar to using only one portion $110_1$ or $110_2$, $116_1$ or $116_2$ of the bilateral semi-tubular vanes 110, 116 from FIG. 2). The configuration of these unilateral semi-tubular vanes 110', 116' may also be varied based on the desired swirling air flow pattern desired. As shown, the direction of the angle of the vanes 110' and 116' are such to aid in the swirling pattern, i.e., they are angled such that both swirling patterns are clockwise or both counter-clockwise.

While the direction of induced rotation of the swirl patterns may be the same, the actual angle of the vanes 110', 116' may be the same or different depending on the desired overall swirl pattern. A shallower angle would produce a flatter, faster swirl pattern, while a greater angle would produce a longer, slower swirl pattern. In an alternate embodiment, the direction of the angle of the vanes 110', 116' may be different so as to provide a shearing relationship between the swirling air flows formed thereby.

While the air flow through the semi-tubular vanes 110', 116' of the air swirler 100' will be less than that through the air swirler 100 illustrated in FIGS. 1-2 (assuming the semi-tubular vanes 110', 116' are the same size as one of the portions ($110_1$ or $110_2$, $116_1$ or $116_2$) of the bilateral semi-tubular vanes 110, 116), the air swirler 100' still benefits from the greater swirl strength for a given flow. This is because the air flowing through the apertures 118' cannot leak out around the sides of the vanes as they can in the slotted vane design shown in FIG. 4.

Figure 4:
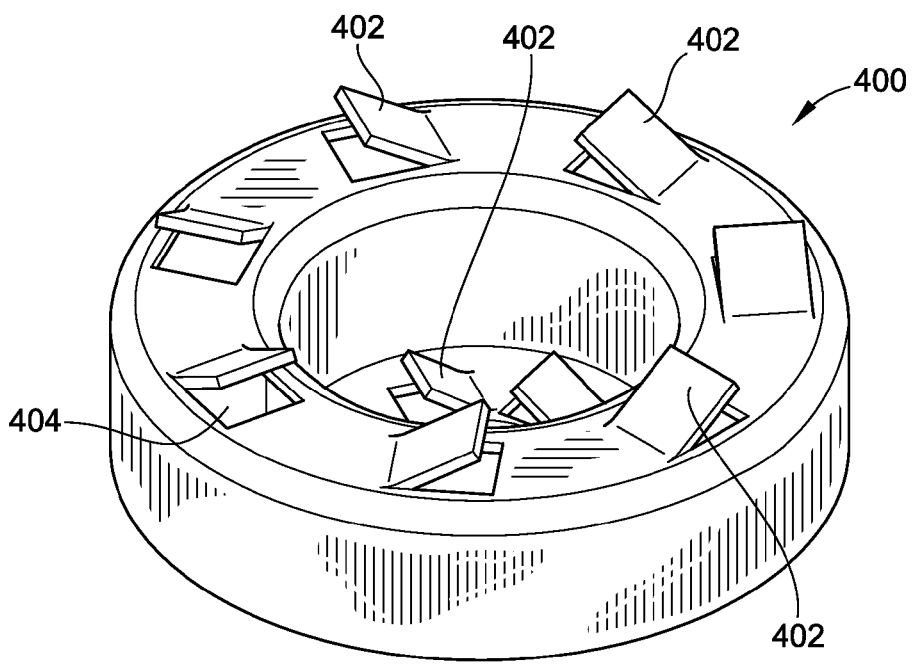
FIG. 4 is an isometric view of a prior art sheet metal air swirler.

This embodiment of the air swirler 100' also benefits from the increased rigidity of the vane geometry as compared with the slotted vane design of FIG. 4, which therefore makes it less susceptible to deformation and potentially fatigue. The embodiment illustrated in FIG. 3 also includes a side wall 120' that extends from the flange portion 114' toward the end wall 106', although in either embodiment the alternative side wall configuration may be used based upon installation requirements.

While the preceding embodiments were discussed utilizing semi-tubular vanes, which are particularly well suited for air swirlers 100, 100' manufactured as a deep drawn sheet metal component so as to not tear the sheet metal during formation thereof, those skilled in the art will recognize that other configurations of vanes may be used within the spirit and scope of the invention. Indeed, various configurations having closed sides on the vanes, as opposed to the slotted vanes illustrated in FIG. 4, may be used. These include by way of example rectangular, triangular, oval, etc. configurations. As such, as used herein the phrase semi-tubular shall be taken to include any form of closed side vanes, whether rounded or angled in configuration.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air swirler for use with a fuel injector to aid in mixing air and fuel provided therethrough for combustion in a combustion chamber, comprising:
    an end wall having formed therein a fuel nozzle receiving aperture and a first plurality of semi-tubular vanes having a continuous wall along the sides thereof, each defining a first angled air flow aperture through the end wall, the first plurality of semi-tubular vanes being arranged around the fuel nozzle receiving aperture; and
    a first circular side wall coupled to the end wall and surrounding the fuel nozzle receiving aperture and the first plurality of semi-tubular vanes so as to form a central well; and
    wherein the first plurality of semi-tubular vanes create a first swirling air flow pattern within the central well when air is passed through the first angled air flow apertures.

2. The air swirler of claim 1, wherein each of the first plurality of semi-tubular vanes are bilateral vanes including a first portion and a second portion having a mirrored vane geometry.

3. The air swirler of claim 1, wherein each of the first plurality of semi-tubular vanes are bilateral vanes including a first portion angled upwardly from the end wall at a first angle and a second portion angled downwardly from the end wall a second angle.

4. The air swirler of claim 3, wherein the first angle and the second angle are the same.

5. The air swirler of claim 3, wherein the first angle and the second angle are different whereby a simplified airfoil (camber) shape is provided.

6. The air swirler of claim 5, wherein each of the first plurality of semi-tubular vanes are formed with a curvature to provide a continuous camber to the simplified airfoil shape.

7. An air swirler for use with a fuel injector to aid in mixing air and fuel provided therethrough for combustion in a combustion chamber, comprising:
    an end wall having formed therein a fuel nozzle receiving aperture and a first plurality of semi-tubular vanes, each defining a first angled air flow aperture through the end wall, the first plurality of semi-tubular vanes being arranged around the fuel nozzle receiving aperture; and
    a first circular side wall coupled to the end wall and surrounding the fuel nozzle receiving aperture and the first plurality of semi-tubular vanes so as to form a central well; and
    wherein the first plurality of semi-tubular vanes create a first swirling air flow pattern within the central well when air is passed through the first angled air flow apertures; and
    a flange extending radially outward from the side wall of the central well, the flange having formed therein a second plurality of semi-tubular vanes, each defining a second angled air flow aperture through the flange, the second plurality of semi-tubular vanes being arranged around the central well; and
    wherein the second plurality of semi-tubular vanes create a second swirling air flow pattern around the first swirling air flow pattern as it exits the central well when air is passed through the second angled air flow apertures.

8. The air swirler of claim 7, further comprising:
a second circular side wall coupled to the flange and surrounding the second plurality of semi-tubular vanes so as to form a secondary swirl chamber; and
wherein the second plurality of semi-tubular vanes create the second swirling air flow pattern within the secondary swirl chamber when air is passed through the second angled air flow apertures.

9. The air swirler of claim 7, wherein each of the first plurality of semi-tubular vanes are bilateral vanes including a first portion and a second portion having a mirrored vane geometry.

10. The air swirler of claim 9, wherein each of the second plurality of semi-tubular vanes are bilateral vanes including a first portion and a second portion having a mirrored vane geometry.

11. The air swirler of claim 10, wherein each of the first plurality of semi-tubular vanes and the second plurality of semi-tubular vanes are oriented such that the first swirling air flow and the second swirling air flow rotate in a same direction.

12. The air swirler of claim 10, wherein each of the first plurality of semi-tubular vanes and the second plurality of semi-tubular vanes are oriented such that the first swirling air flow and the second swirling air flow rotate in opposite directions.

13. The air swirler of claim 7, wherein each of the first plurality of semi-tubular vanes and the second plurality of semi-tubular vanes are oriented such that the first swirling air flow and the second swirling air flow rotate in a same direction.

14. The air swirler of claim 7, wherein each of the first plurality of semi-tubular vanes and the second plurality of semi-tubular vanes are oriented such that the first swirling air flow and the second swirling air flow rotate in opposite directions.

15. The air swirler of claim 7, wherein the end wall, the fuel nozzle receiving aperture, the first plurality of semi-tubular vanes, the first angled air flow apertures through the end wall, the first circular side wall, the flange extending radially outward from the side wall of the central well, the second plurality of semi-tubular vanes, and the second angled air flow apertures through the flange are formed as a unitary, single piece, deep drawn sheet metal component.

16. An air swirler for use with a fuel injector to aid in mixing air and fuel provided therethrough for combustion in a combustion chamber, comprising:
an end wall having formed therein a fuel nozzle receiving aperture and a first plurality of bilateral semi-tubular vanes, each defining a first air flow aperture through the end wall, the first plurality of bilateral semi-tubular vanes being arranged around the fuel nozzle receiving aperture, the first plurality of bilateral semi-tubular vanes creating a first swirling air flow pattern when air is passed through the first air flow apertures; and
a flange axially displaced from the end wall having a central aperture formed therein to provide fluid communication therethrough for the first swirling air flow pattern, and the flange having formed therein a second plurality of bilateral semi-tubular vanes, each defining a second air flow aperture through the flange, the second plurality of bilateral semi-tubular vanes being radially displaced from the first plurality of bilateral semi-tubular vanes, the second plurality of bilateral semi-tubular vanes creating a second swirling air flow pattern when air is passed through the second air flow apertures; and
a second circular side wall coupled to the flange and surrounding the second plurality of semi-tubular vanes so as to form a secondary swirl chamber.

17. The air swirler of claim 16, wherein each of the first plurality of bilateral semi-tubular vanes include a first portion and a second portion having a mirrored vane geometry; and wherein each of the second plurality of bilateral semi-tubular vanes include a first portion and a second portion having a mirrored vane geometry.

18. An air swirler for use with a fuel injector to aid in mixing air and fuel provided therethrough for combustion in a combustion chamber, comprising:
an end wall having formed therein a fuel nozzle receiving aperture and a first plurality of bilateral semi-tubular vanes, each defining a first air flow aperture through the end wall, the first plurality of bilateral semi-tubular vanes being arranged around the fuel nozzle receiving aperture, the first plurality of bilateral semi-tubular vanes creating a first swirling air flow pattern when air is passed through the first air flow apertures; and
a flange axially displaced from the end wall having a central aperture formed therein to provide fluid communication therethrough for the first swirling air flow pattern, and the flange having formed therein a second plurality of bilateral semi-tubular vanes, each defining a second air flow aperture through the flange, the second plurality of bilateral semi-tubular vanes being radially displaced from the first plurality of bilateral semi-tubular vanes, the second plurality of bilateral semi-tubular vanes creating a second swirling air flow pattern when air is passed through the second air flow apertures;
wherein each of the first plurality of bilateral semi-tubular vanes include a first portion formed to extend in a first direction and at a first angle relative to the end wall and a second portion formed to extend in a second direction and at a second angle relative to the end wall, and wherein the first angle and the second angle are different.

19. An air swirler for use with a fuel injector to aid in mixing air and fuel provided therethrough for combustion in a combustion chamber, comprising:
an end wall having formed therein a fuel nozzle receiving aperture and a first plurality of bilateral semi-tubular vanes, each defining a first air flow aperture through the end wall, the first plurality of bilateral semi-tubular vanes being arranged around the fuel nozzle receiving aperture, the first plurality of bilateral semi-tubular vanes creating a first swirling air flow pattern when air is passed through the first air flow apertures; and
a flange axially displaced from the end wall having a central aperture formed therein to provide fluid communication therethrough for the first swirling air flow pattern, and the flange having formed therein a second plurality of bilateral semi-tubular vanes, each defining a second air flow aperture through the flange, the second plurality of bilateral semi-tubular vanes being radially displaced from the first plurality of bilateral semi-tubular vanes, the second plurality of bilateral semi-tubular vanes creating a second swirling air flow pattern when air is passed through the second air flow apertures;
wherein each of the second plurality of bilateral semi-tubular vanes include a first portion formed to extend in a first direction and at a first angle relative to the flange and a second portion formed to extend in a second direction and at a second angle relative to the flange, and wherein the first angle and the second angle are different.

20. An air swirler for use with a fuel injector to aid in mixing air and fuel provided therethrough for combustion in a combustion chamber, comprising:
   an end wall having formed therein a fuel nozzle receiving aperture and a first plurality of bilateral semi-tubular vanes, each defining a first air flow aperture through the end wall, the first plurality of bilateral semi-tubular vanes being arranged around the fuel nozzle receiving aperture, the first plurality of bilateral semi-tubular vanes creating a first swirling air flow pattern when air is passed through the first air flow apertures; and
   a flange axially displaced from the end wall having a central aperture formed therein to provide fluid communication therethrough for the first swirling air flow pattern, and the flange having formed therein a second plurality of bilateral semi-tubular vanes, each defining a second air flow aperture through the flange, the second plurality of bilateral semi-tubular vanes being radially displaced from the first plurality of bilateral semi-tubular vanes, the second plurality of bilateral semi-tubular vanes creating a second swirling air flow pattern when air is passed through the second air flow apertures;
   wherein each of the first plurality of bilateral semi-tubular vanes include a first portion formed to extend in a first direction and at a first angle relative to the end wall and a second portion formed to extend in a second direction and at a second angle relative to the end wall, and wherein the first angle and the second angle are different, and wherein each of the second plurality of bilateral semi-tubular vanes include a third portion formed to extend in a third direction and at a third angle relative to the flange and a fourth portion formed to extend in a fourth direction and at a fourth angle relative to the flange, and wherein the third angle and the fourth angle are different.

* * * * *